United States Patent [19]
Beauducel et al.

[11] Patent Number: 5,465,270
[45] Date of Patent: Nov. 7, 1995

[54] PROCESS AND DEVICE FOR THE DIGITIZED TRANSMISSION OF SIGNALS

[75] Inventors: Claude Beauducel, Henonville; Patrick Coquerel, Sartrouville, both of France

[73] Assignee: Institut Francias du Petrole, Rueil Malmaison, France

[21] Appl. No.: 112,339

[22] Filed: Aug. 27, 1993

[30] Foreign Application Priority Data

Aug. 28, 1992 [FR] France .................... 92 10427

[51] Int. Cl.⁶ .................................. H04B 14/04
[52] U.S. Cl. ................. 375/242; 375/259; 375/355; 375/358; 341/143; 340/855.4; 340/870.21
[58] Field of Search .................... 375/25, 27, 28, 375/59, 106, 107, 103, 242, 244, 247, 251, 260, 295, 316, 350, 354, 355, 356, 358; 340/855.4, 870.21; 332/106; 341/61, 110, 126, 143, 173; 455/343; 364/724.1

[56] References Cited

U.S. PATENT DOCUMENTS

| | | | |
|---|---|---|---|
| 3,350,644 | 10/1967 | McNair | 375/107 |
| 3,370,270 | 2/1968 | Cesareo | 375/107 |
| 3,873,961 | 3/1975 | Lee et al. | 375/107 |
| 4,084,069 | 4/1978 | Looschen | 375/59 |
| 4,158,810 | 6/1979 | Leskovar | 375/25 |
| 5,051,799 | 9/1991 | Paul et al. | 375/25 |

FOREIGN PATENT DOCUMENTS

| | | |
|---|---|---|
| 0300771 | 1/1989 | European Pat. Off. |
| 0477077 | 3/1992 | European Pat. Off. |
| 1549622 | 8/1979 | United Kingdom |

Primary Examiner—Stephen Chin
Assistant Examiner—Amanda T. Le
Attorney, Agent, or Firm—Antonelli, Terry, Stout & Kraus

[57] ABSTRACT

A device for simplifying transmission of analog signals received from sensors to a remote station in accordance with the invention includes at least one local electronic module including in combination a modulator for oversampling each analog signal and converting each oversampled analog signal into lower resolution digital words and a transmitter for transmitting the lower resolution words as a bit stream on at least one first transmission channel; at least one synchronization element producing a clock signal allowing synchronization of each modulator with the remote station; and at least one reception module in the remote station including a receiver for receiving the transmitted lower resolution words as a bit stream and a digital filter, coupled to the receiver, for converting each received bit stream received into digital words of a higher resolution (typically 16 or 24 bit words. The invention is useful for transmission of seismic data.

15 Claims, 2 Drawing Sheets

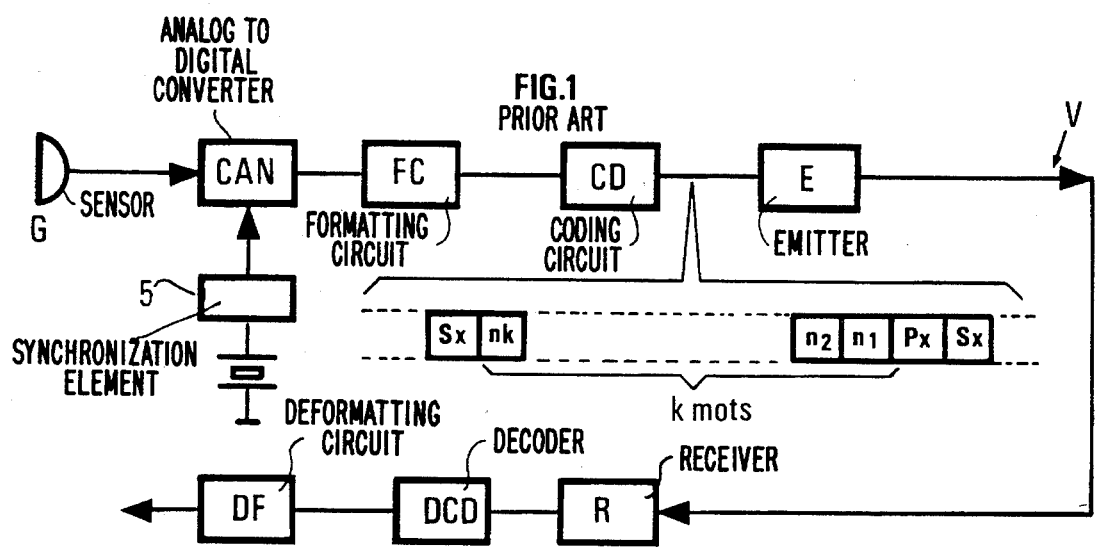
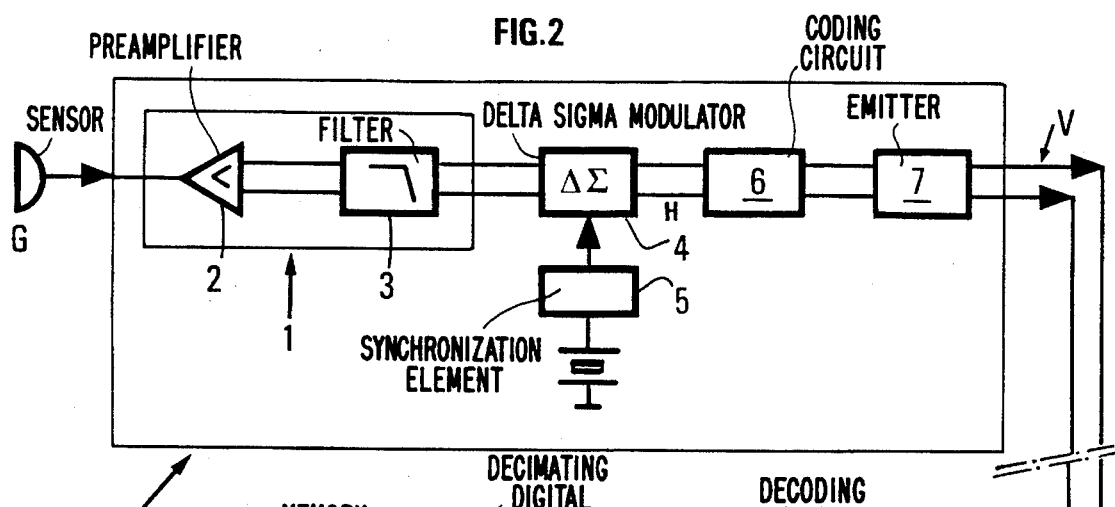
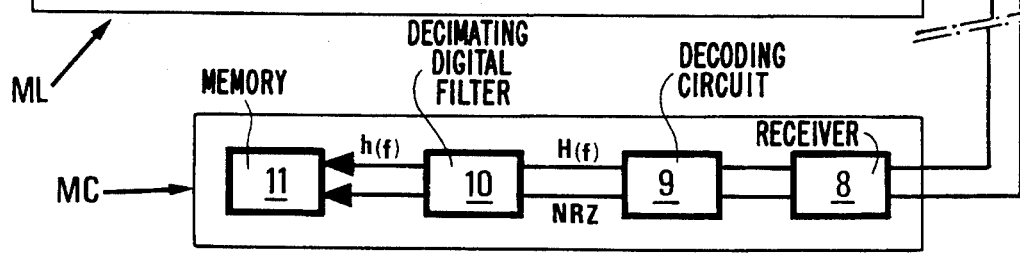
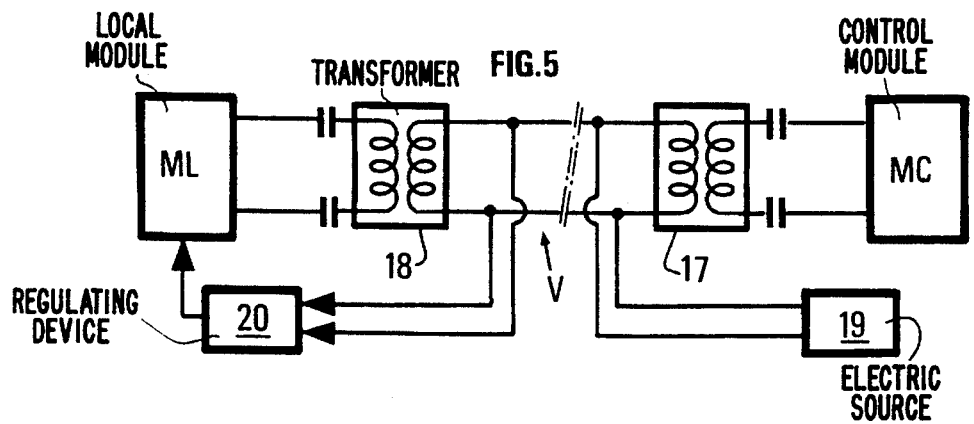

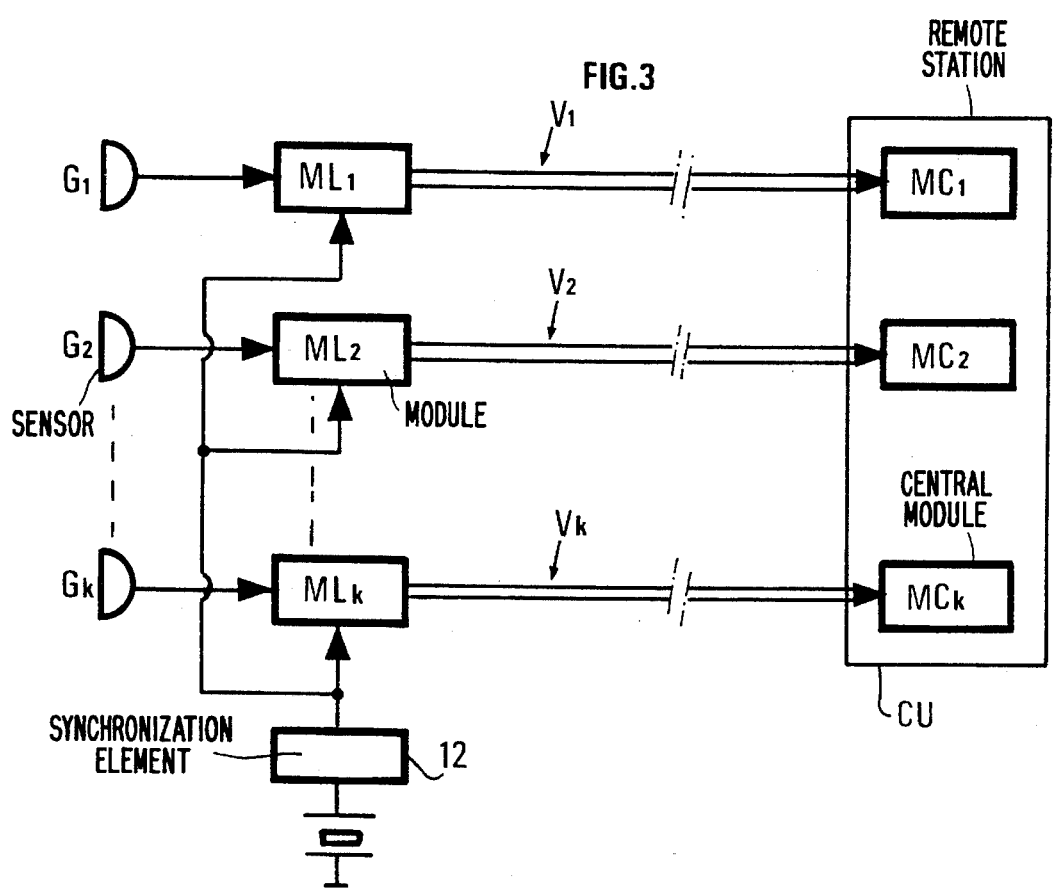
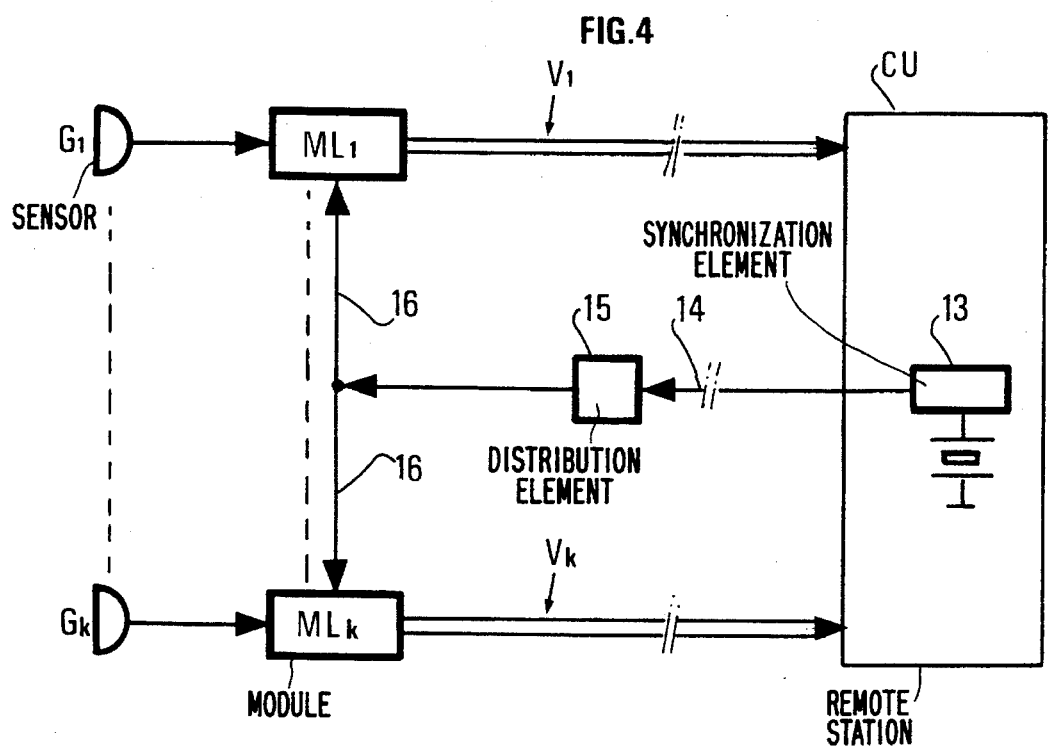

PROCESS AND DEVICE FOR THE DIGITIZED TRANSMISSION OF SIGNALS

FIELD OF THE INVENTION

The present invention relates to a process for transmitting to a central station signals generated by a sensor and to a device for the implementation thereof.

The process is notably applied to the transmission of acoustic or seismic signals and it is particularly advantageous for centralizing, in a single recording station, signals picked up by a reception device including a relatively great number of sensors such as those which are frequently used in seismic prospecting for example.

BACKGROUND OF THE INVENTION

The signals picked up by seismic sensors (geophones or hydrophones) or by seismic receivers consisting of several interconnected sensors may be transmitted to a recording station in an analog form through conducting lines or cables. When the transmission distances are relatively long, acquisition devices located close to the sensors or to the receivers are generally preferably used which sample and digitize the signals received, and store and transmit the signals to a central station through specific transmission channels or transmission channels common to several acquisition devices. The digital words produced are coded for the transmission thereof. A bipolar code is used allowing both the data and a clock signal (A.M.I., HDB3, Manchester type codes, etc) to be transmitted. The clock and data are integrated into a transmission frame associated with identification, error detection or synchronization prefixes or suffixes. For these conversions, analog-to-digital converters of the over-sampling type, including the combination of a modulator and of a digital filter, may be notably used. The modulator is of the delta-sigma type and generates a series of low-resolution digital words in the form of a continuous bitstream at a very high sampling frequency (256 kHz for example). These words have a mean amplitude varying in time proportionally to the amplitude of the analog signals applied. Typically, these words comprise only one bit. The digital filter is connected to the modulator output. It receives therefrom a bitstream and produces high-resolution digital words (16 to 24 bits for example) of a much lower frequency in an operation known as decimation. Converters of this type are for example described in U.S. Pat. Nos. 4,866,442; 4,943,807; 4,994,804 or in French Patent Application FR-90/11,527 (corresponding to U.S. Pat. No. 5,245,647).

Conversion of analog signals into digital words may in some cases be achieved locally, in the immediate vicinity of the sensors or the receivers. U.S. Pat. No. 5,051,799 describes for example a transmission device where analog signals are applied to a local converter of the oversampling type including a modulator associated with a decimating digital filter and where the digital words coming from the converter are emitted on a transmission channel, included in a transmission frame with addition of error correction bits.

Whatever the type of converter used, a local module for acquiring signals, formatting the digital words produced by analog-to-digital conversion and transmitting each frame is costly and its power consumption is high.

SUMMARY OF THE INVENTION

The process according to the invention allows simplification of the operations which are often required for the transmission of analog signals, such as signals picked up by receivers, to a remote recording station. It comprises in combination:

the acquisition of each analog signal to be transmitted by application to a local modulator which changes the analog signal into a bitstream by oversampling each analog signal to be transmitted into lower resolution words by application to a local modulator;

the transmission of at least one clock signal allowing synchronization of the remote station with each modulator;

the direct transmission of each bitstream on a transmission channel without formatting the lower resolution digital words corresponding to each analog signal; and the conversion, by digital filtering in the remote station, of each received bitstream received into higher resolution digital words translating the analog signals.

Transmission of the clock signal is for example obtained by coding each bitstream by a clock signal so as to transmit the clock signal at the same time as the bitstream. This clock signal may be distinct for each local modulator or produced for several local modulators (by an outer synchronization element).

The transmission of the clock signal may also be obtained by separately transmitting each clock signal for example from the remote station towards each local modulator.

The implementing device comprises:

at least one local electronic module including in combination a modulator for changing each analog signal into a bitstream, and an emitter for emitting each bitstream on a transmission channel;

at least one synchronization element producing a clock signal which allows synchronization of each modulator with the remote station; and at least one reception module including a receiver and a digital filter for converting each bitstream into digital samples.

It is possible to associate a coding element with each modulator in order to apply to each bitstream a coding allowing transmission of a clock signal at the same time as the bitstream, and at least one decoding element completing the coding element in the remote station.

The device comprises for example a synchronization element for generating a clock signal. The sychronization element is associated with each local modulator or is common to several local modulators, or associated with the remote station. In the last case, the device further comprises at least a second transmission channel distinct from the first channel for linking the synchronization element in the remote station to several local modulators.

In the case where the transmission channels are lines, the device may further comprise an insulating means for conveying on each transmission line currents for supplying power to each local module.

With such a distribution of functions, the local digitization set is small. It may be placed in the sensor housing and its power consumption is low, which allows battery powering to be achieved. Transmission is performed without any formatting operation which is unlike the processes known in the art. The successive bits are therefore independent of one another and the digital filtering (or decimation) achieved on each bitstream has the effect of minimizing transmission incidents due to interferences. Complex signal reception equipments may therefore be easily set up at attractive costs. Simplification of the local digitization modules allows the signals received individually by each sensor to be transferred to a central station at a lower cost. One advantageous consequence is that it enables operators, from the central station, to combine at will the elementary signals and therefore to change at any time, without having to go out in the field, the features of a signal reception device so as to conform it to particular reception conditions.

BRIEF DESCRIPTION OF THE DRAWINGS

Other features and advantages of the method and of the device according to the invention will be clear from reading the description hereafter of embodiments given by way of non limitative examples, with reference to the accompanying drawings in which:

FIG. 1 diagrammatically shows a prior art device for transmitting digitized signals.

FIG. 2 shows an embodiment of the invention with synchronization means within each local module.

FIG. 3 diagrammatically shows a first modification of the embodiment of FIG. 2.

FIG. 4 diagrammatically shows a second modification of the embodiment of FIG. 2.

FIG. 5 shows a lay-out allowing power to be supplied to local modules associated with the sensors when the available transmission channels are lines.

DESCRIPTION OF THE PREFERRED EMBODIMENTS

A conventional prior art process for taking advantage of a digitized transmission is illustrated in FIG. 1. A sensor or a receiver G such as a geophone an acquisition chain including an analog-to-digital converter CAN of the oversampling type for example, is associated with a synchronization element 5. The digital words coming from converter CAN are applied to a formatting circuit FC of a well-known type which gathers them together in groups of k words n1, n2 . . . nk (k being any predetermined integer) and adds to each group a frame identification and recognition prefix Px and suffix Sx. Each assembly formatted thereby is then coded by a circuit CD and applied to the available transmission channel V by an emitter E. The reception chain must in this case comprise, apart from a receiver R and decoder DCD, a deformatting circuit DF for restoring the digital words.

The device according to the invention comprises (FIG. 2) a local module ML associated with a sensor G. This module ML includes a circuit 1 for adapting the signals from a sensor G, consisting of a preamplifier 2 and of a filter 3 for example. After adaptation by circuit 1, the analog signals are applied to a modulator 4, of the delta-sigma type for example, producing 1-bit words at a high frequency F (256 kHz for example) defined by a synchronization element 5. A CS5323 type modulator manufactured by the Crystal Semiconductors Company may for example be used. The stream of 1-bit words coming from modulator 4 is applied directly here to a coding circuit 6 applying a predetermined coding allowing a clock signal to be conveyed at the same time as the signals, such as the HDB3 code, a multi-level code, the CMI-3 code suited to an optical type transmission, etc. The coded bitstreams are then applied to a transmission channel V by means of an emitter 7 adapted to this channel: hertzian modulator, light-emitting diode, etc.

The central module MC receiving the signals comprises a reception chain including in this case a receiver 8 and a decoding circuit 9 completing coding circuit 6. The decoded bitstreams are thereafter applied to a digital filter 10 which carries out a decimation so as to produce digital words of higher resolution (16 or 24 bits) with a sampling frequency f much lower than the oversampling frequency F, these digital words being stored in a memory 11. CS5322 type digital filters manufactured by Crystal Semiconductors or TMC2242 type filters manufactured by the TRW Company may for example be used.

According to the alternative embodiment illustrated in FIG. 3, one or several synchronization elements 12 analogous to element 5 and located outside the local modules are used, each element being associated with several modules ML1, ML2 . . . MLk.

According to another alternative embodiment illustrated in FIG. 4, a synchronization element 13 analogous to the previous element 5, but arranged in the remote station CU, may also be used. In this case, the clock signal produced by this central synchronization element 13 may be transmitted through a distinct line 14 to a distribution element 15 located close to several sensors G1 to Gk which distributes it through conductors 16 to the various associated local modules ML1 to MLk.

An additional electric conductor for the separate transfer of the common clock signal produced in station CU towards each local module may also be added to each transmission channel.

When a transmission line is used for connecting each local module M to the remote station, the module may be supplied with electricity through the same line as shown in FIG. 5 for example. The central module MC and the corresponding local module ML are connected to the transmission channel V which links them together by means of line transformers 17, 18, which allows the central station to connect an electric source 19 feeding directly a voltage regulating device 20 to the other end of the line, which produces supply voltages for the circuits of the local module ML.

The embodiments which have been described above comprise respectively coding and decoding means 6, 9 allowing transmission, on transmission channels V1 . . . Vk, of clock signals at the same time as the various bitstreams. These means are useful and generally utilized to minimize transmission errors on relatively long transmission channels. However, without departing from the scope of the invention, these coding and decoding means may be suppressed when the transmission distance is short enough.

Without departing from the scope of the invention, the specialized digital filters 10 may also be replaced by one or several DSP type processors manufactured for example by the Analog Device Company under reference 2205, these processors being programmed for performing the filterings described above.

We claim:

1. A process for simplifying transmission of analog signals received by a plurality of sensors to a remote station comprising:

associating with each sensor a local modulator for oversampling each analog signal to be transmitted and digitally converting each oversampled analog signal into lower resolution digital words by application to a local modulator;

transmitting from each local modulator to the remote station a clock signal allowing a synchronization of the remote station with each local modulator;

transmitting as a bit stream on a transmission channel without formatting the lower resolution digital words corresponding to each analog signal; and converting, by digital filtering at the remote station, each received bit stream into higher resolution digital words.

2. A process as claimed in claim 1 comprising:

transmitting the clock signal with each bit stream by coding each bit stream with the clock signal.

3. A process is claimed in claim 2 comprising:

producing a distinct clock signal for each local modulator.

4. A process as claimed in claim 2 comprising:

producing the clock signal for several local modulators.

5. A process as claimed in claim 1 further comprising:

producing a clock signal at the remote station;

transmitting the clock signal produced at the remote station from the remote station to each local modulator; and wherein each clock signal transmitted from the local modulator to the remote station is the clock signal transmitted from the remote station to each local modulator.

6. A device for simplifying transmission of analog signals received from sensors to a remote station comprising:

at least one local electronic module including in combination a modulator for oversampling each analog signal and converting each oversampled analog signal into lower resolution digital words and a transmitter for transmitting the lower resolution words as a bit stream on at least one first transmission channel;

at least one synchronization element producing a clock signal allowing synchronization of each modulator with the remote station; and at least one reception module in the remote station including a receiver for receiving the transmitted lower resolution words as a bit stream and a digital filter, coupled to the receiver for converting each received bit stream received into digital words of a higher resolution.

7. A device as claimed in claim 6 further comprising:

a coding element, coupled to each modulator, for applying to each bit stream a coding allowing transmission of a clock signal with the bit stream; and wherein each receiver is coupled to at least one decoding element and decodes the coding produced by the coding element.

8. A device as claimed in claim 7 further comprising:

the at least one synchronization element comprises a synchronization element coupled to each modulator.

9. A device as claimed in claim 8 wherein:

the synchronization element is associated with the remote station; and wherein the device also comprises at least one second transmission channel distinct from the first transmission channel for connecting the synchronization element to several modulators.

10. A device as claimed in claim 7 further comprising:

the at least one synchronization element comprises a common synchronization element coupled to several modulators.

11. A device as claimed in any one of claims 6 to 9 wherein:

each first transmission channel comprises transmission lines; and the device also includes a means for conveying on each transmission line currents for supplying power to each module.

12. A device as claimed in any one of claims 6 to 9, wherein:

each module comprises an amplifier and a filter, coupled to the amplifier, for converting the analog signals before their application to an associated modulator.

13. A device as claimed in claim 7 wherein:

the coding element is a bipolar coding element.

14. A device as claimed in claim 7 wherein:

the coding element is a multi-level coding element.

15. A device as claimed in claim 7 wherein:

at least one first transmission channel comprises an optical fiber; and the coding element is a Coded Mark Inversion Type three element.

* * * * *